(12) United States Patent
Alonso et al.

(10) Patent No.: US 10,803,245 B2
(45) Date of Patent: Oct. 13, 2020

(54) COMPILING DOCUMENTS INTO A TIMELINE PER EVENT

(71) Applicant: Microsoft Technology Licensing, LLC, Redmond, WA (US)

(72) Inventors: Omar Alonso, Redwood Shores, CA (US); Vasileios Kandylas, Sunnyvale, CA (US); Serge-Eric Tremblay, Pullman, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 474 days.

(21) Appl. No.: 15/256,924

(22) Filed: Sep. 6, 2016

(65) Prior Publication Data

US 2018/0067910 A1 Mar. 8, 2018

(51) Int. Cl.
*G06F 40/289* (2020.01)
*G06F 16/28* (2019.01)
(Continued)

(52) U.S. Cl.
CPC ...... *G06F 40/289* (2020.01); *G06F 16/24578* (2019.01); *G06F 16/285* (2019.01); *H04L 67/306* (2013.01)

(58) Field of Classification Search
CPC .................. G06F 17/2785; G06F 17/30598
See application file for complete search history.

(56) References Cited

U.S. PATENT DOCUMENTS 5,918,236 A * 6/1999 Wical .................... G06F 17/274
704/1
5,953,718 A * 9/1999 Wical .................... G06F 16/345
(Continued)

FOREIGN PATENT DOCUMENTS

EP 1818839 A1 8/2007

OTHER PUBLICATIONS

Swan, et al., "Automatic Generation of Overview Timelines", In Proceedings of the 23rd annual international ACM SIGIR conference on Research and development in information retrieval, Jul. 1, 2000, pp. 49-56.

(Continued)

*Primary Examiner* — Scott T Baderman
*Assistant Examiner* — Benjamin Smith
(74) *Attorney, Agent, or Firm* — Medley, Behrens & Lewis, LLC

(57) ABSTRACT

Representative embodiments disclose mechanisms to compile documents into a timeline document that tracks the evolution of a topic over time. Social media documents can be used to identify importance or popularity of linked documents (i.e., documents shared by social media in a post, tweet, etc.). A collection of social media documents is analyzed and used to identify a series of n-grams and a ranked list of linked documents. A subset of the ranked list is selected based upon similarity to the series of n-grams. The subset is then summarized and captured, along with underlying supporting data, into an entry of a timeline document. Related entries in different timeline documents can be linked to create a pivot point that allows a user to jump from one timeline to another. Timeline documents can be made available as part of a search performed by a query system.

20 Claims, 9 Drawing Sheets

(51) Int. Cl.
*G06F 16/2457* (2019.01)
*H04L 29/08* (2006.01)

(56) References Cited

U.S. PATENT DOCUMENTS

| | | | |
|---|---|---|---|
| 6,600,501 B1 | 7/2003 | Israel et al. | |
| 7,296,016 B1* | 11/2007 | Farach-Colton | G06F 16/9535 |
| 7,373,612 B2* | 5/2008 | Risch | G06F 17/30716 |
| | | | 707/E17.093 |
| 7,577,651 B2 | 8/2009 | Jones et al. | |
| 7,653,702 B2* | 1/2010 | Miner | G06F 17/30038 |
| | | | 709/201 |
| 7,664,775 B2 | 2/2010 | Reed et al. | |
| 8,091,033 B2 | 1/2012 | von Sichart et al. | |
| 8,108,376 B2* | 1/2012 | Okamoto | G06F 17/3071 |
| | | | 706/45 |
| 8,352,384 B2* | 1/2013 | Mansinghka | G06N 7/04 |
| | | | 327/603 |
| 8,356,248 B1 | 1/2013 | Killalea | |
| 8,645,286 B2* | 2/2014 | Jonas | G06N 7/005 |
| | | | 706/10 |
| 8,826,123 B2 | 9/2014 | Audet | |
| 8,984,429 B2 | 3/2015 | Clark et al. | |
| 9,152,692 B2* | 10/2015 | Schueppert | G06F 17/30551 |
| 9,208,779 B2* | 12/2015 | Sak | G10L 15/197 |
| 9,336,277 B2* | 5/2016 | Behzadi | G06F 17/3053 |
| 9,461,876 B2* | 10/2016 | Van Dusen | H04L 41/04 |
| 9,659,255 B2* | 5/2017 | Jonas | G06N 7/005 |
| 9,740,368 B1* | 8/2017 | Love | G06F 3/04817 |
| 2004/0068697 A1* | 4/2004 | Harik | G06F 16/313 |
| | | | 715/234 |
| 2004/0090472 A1* | 5/2004 | Risch | G06F 17/30716 |
| | | | 715/853 |
| 2006/0031486 A1* | 2/2006 | Miner | G06F 17/30038 |
| | | | 709/224 |
| 2007/0203868 A1* | 8/2007 | Betz | G06N 20/00 |
| | | | 706/50 |
| 2007/0288447 A1 | 12/2007 | Andris et al. | |
| 2008/0010274 A1* | 1/2008 | Carus | G06N 99/005 |
| 2008/0082578 A1 | 4/2008 | Hogue et al. | |
| 2008/0270946 A1* | 10/2008 | Risch | G06F 17/30716 |
| | | | 715/848 |
| 2008/0275849 A1* | 11/2008 | Basu | G06Q 30/02 |
| 2008/0276201 A1* | 11/2008 | Risch | G06F 17/30716 |
| | | | 715/853 |
| 2008/0294663 A1 | 11/2008 | Heinley et al. | |
| 2008/0319746 A1* | 12/2008 | Okamoto | G06F 16/345 |
| | | | 704/245 |
| 2009/0228238 A1* | 9/2009 | Mansinghka | G06N 7/005 |
| | | | 702/181 |
| 2009/0241048 A1 | 9/2009 | Augustine et al. | |
| 2009/0248678 A1* | 10/2009 | Okamoto | G06F 17/3071 |
| 2010/0306249 A1* | 12/2010 | Hill | G06Q 30/02 |
| | | | 707/769 |
| 2011/0208676 A1* | 8/2011 | Jonas | G06N 7/005 |
| | | | 706/10 |
| 2011/0213655 A1* | 9/2011 | Henkin | G06Q 30/00 |
| | | | 705/14.49 |
| 2011/0276561 A1* | 11/2011 | Dulitz | G06F 16/24578 |
| | | | 707/709 |
| 2012/0047421 A1 | 2/2012 | Holman | |
| 2012/0278060 A1* | 11/2012 | Cancedda | G10L 15/06 |
| | | | 704/2 |
| 2012/0290950 A1* | 11/2012 | Rapaport | H04L 51/32 |
| | | | 715/753 |
| 2013/0144605 A1* | 6/2013 | Brager | G06F 40/40 |
| | | | 704/9 |
| 2013/0157234 A1 | 6/2013 | Gulli et al. | |
| 2013/0212491 A1 | 8/2013 | Yerli | |
| 2013/0298000 A1* | 11/2013 | Zuccarino | G06F 17/2235 |
| | | | 715/205 |
| 2014/0075004 A1* | 3/2014 | Van Dusen | H04L 41/04 |
| | | | 709/223 |
| 2014/0079297 A1* | 3/2014 | Tadayon | G06K 9/00288 |
| | | | 382/118 |
| 2014/0081899 A1* | 3/2014 | Jonas | G06N 7/005 |
| | | | 706/52 |
| 2014/0201126 A1* | 7/2014 | Zadeh | G06K 9/627 |
| | | | 706/52 |
| 2014/0358906 A1* | 12/2014 | Behzadi | G06F 17/3053 |
| | | | 707/723 |
| 2014/0359411 A1* | 12/2014 | Botta | G06F 17/2288 |
| | | | 715/205 |
| 2015/0073788 A1* | 3/2015 | Sak | G10L 15/063 |
| | | | 704/235 |
| 2015/0112963 A1* | 4/2015 | Mojtahedi | G06F 17/3087 |
| | | | 707/711 |
| 2015/0169722 A1* | 6/2015 | Schueppert | G06F 17/30551 |
| | | | 707/738 |
| 2015/0186532 A1* | 7/2015 | Agarwal | G06F 17/30867 |
| | | | 707/722 |
| 2015/0234820 A1* | 8/2015 | Aravamudan | H04N 21/4668 |
| | | | 707/769 |
| 2015/0248476 A1* | 9/2015 | Weissinger | H04L 65/60 |
| | | | 707/737 |
| 2015/0310130 A1* | 10/2015 | Musuluri | G06F 17/30864 |
| | | | 707/725 |
| 2016/0085742 A1* | 3/2016 | Mahmud | G06F 17/2735 |
| | | | 704/9 |
| 2016/0301651 A1* | 10/2016 | Abou Mahmoud | H04L 51/32 |
| 2017/0017721 A1* | 1/2017 | Sauper | G06F 17/30867 |
| 2017/0083817 A1* | 3/2017 | Di Sciullo | G06N 5/025 |
| 2017/0147696 A1* | 5/2017 | Evnine | G06F 17/30867 |
| 2017/0220578 A1* | 8/2017 | Kazi | G06F 17/3053 |
| 2017/0220677 A1* | 8/2017 | Kazi | G06F 17/30684 |
| 2017/0235820 A1* | 8/2017 | Conrad | G06F 17/30675 |
| | | | 707/728 |
| 2017/0255870 A1* | 9/2017 | Jonas | G06N 7/005 |

OTHER PUBLICATIONS

Shahaf, et al., "Information Cartography", In Journal of Communications of the ACM, vol. 58, No. 11, Nov. 2015, pp. 62-73.

"International Search Report and Written Opinion Issued in PCT Application No. PCT/US2017/049233", dated Nov. 21, 2017, 12 Pages.

* cited by examiner

| TIMELINE: MICROSOFT | | | |
|---|---|---|---|
|  | Nokia is coming back to phones and tablets | 05/18/2016 | #tech |
|  | Exclusive: Big data breaches found at major email serveces | 05/04/2016 | #bigdata |
|  | Windows 10 interrupts a live TV broadcast with an unwanted upgrade | 04/28/2016 | #windows10 |
|  | Ubuntu's bash and Linux command line coming to Windows 10 | 03/30/2016 | #linux |
|  | Microsoft terminates its Tay AI chatbot after she turns into a Nazi | 03/24/2016 | #ai |
|  | Microsoft is trying to make Chrome extensions work on Edge | 03/19/2016 | #technology |
|  | Microsoft wants to monopolise games development on PC – and we must fight it | 03/04/2016 | #microsoft |
|  | Microsoft no longer supports Internet Explorer 8, 9, and 10 | 01/12/2016 | #microsoft |
|  | Microsoft is pulling the plug on Internet Explorer 8, 9, and 10 next Tuesday | 01/06/2016 | #tech |
|  | Exclusive: Microsoft to warn email users of suspected hacking by governments | 12/31/2015 | #hacking |
|  | Microsoft may have your encryption key: here's how to take it back | 12/30/2015 | #security |
|  | Microsoft officially launches Cortana on iPhone and Android | 12/09/2015 | #iphone |

FIG. 3

COMPILING DOCUMENTS INTO A TIMELINE PER EVENT

FIELD

This application relates generally to information technology. More specifically, embodiments disclosed herein collect a plurality of documents and compile the documents into a timeline document that tracks evolution and development of topics in the documents over time.

BACKGROUND

With the advent of a more interconnected world, the number of documents, news stories, articles, and other items of interest has geometrically exploded. It is difficult for any individual to identify connections between disparate items of interest and track how topics of interest evolve over time. While search engines can return a vast number of documents and a vast amount of information, the returned information mostly represents a single snapshot in time and leaves a user to sort through the vast amount of presented data to identify items of interest.

While some strides have been made to organize information to help make it more comprehensible and easier to understand, the technical challenges of automating any such information organization are formidable. For example, it is very difficult for a computer or other system to identify what may be of interest to a user. One approach that has been tried is to present information to a user, see what catches a user's attention and then attempt to present other information that is similar in nature. However, even with this approach, the information presented is rarely organized in a way that can be easily understood and assimilated by a user. Information that changes over time only exacerbates the problem and there is little or no ability of a system to track evolution of information over time.

It is within this context that the present embodiments arise.

BRIEF DESCRIPTION OF DRAWINGS

FIG. 3 illustrates example presentation UI for a timeline document.

DETAILED DESCRIPTION

Figure 1:
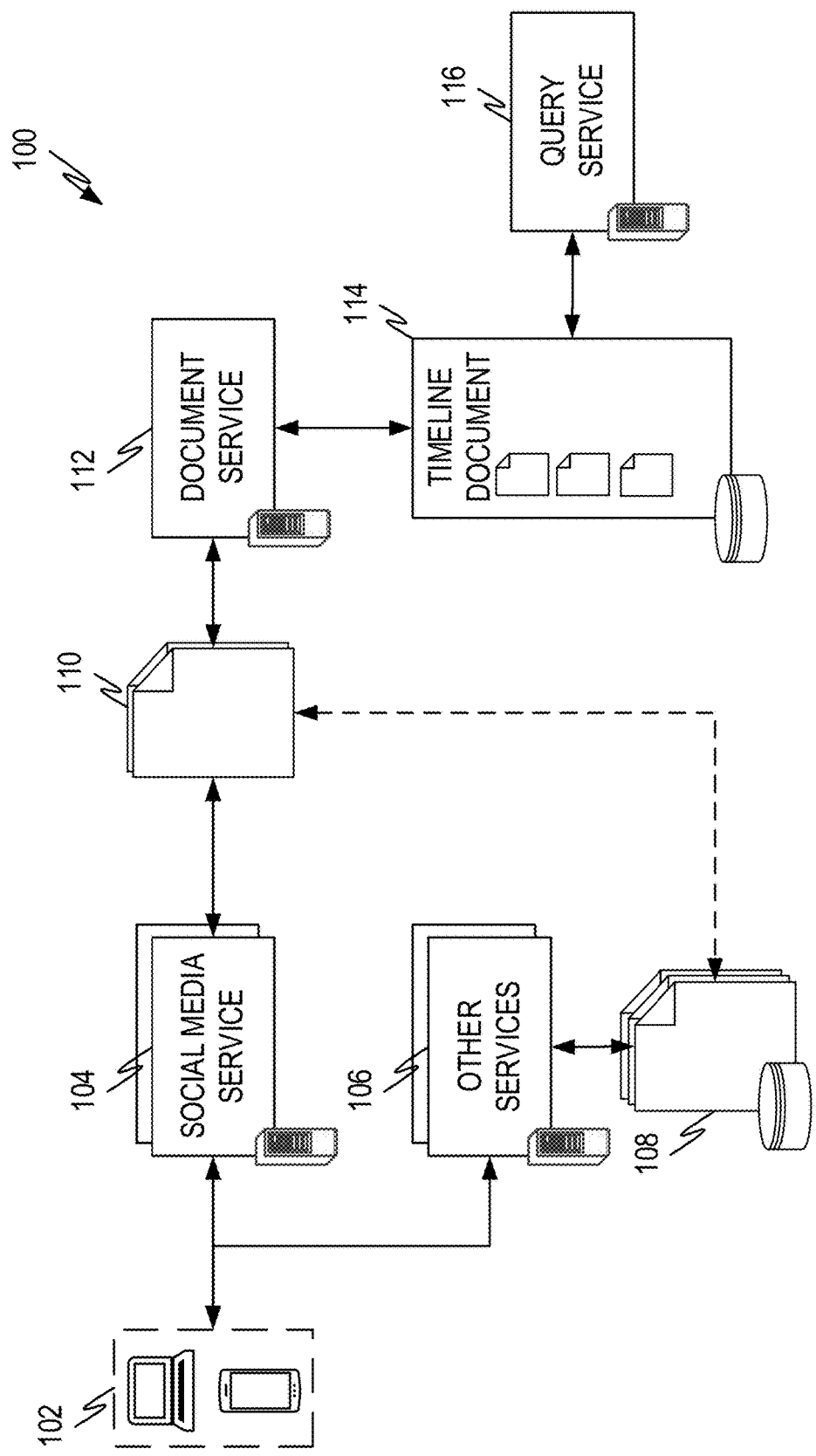
FIG. 1 illustrates an example architecture of a system to compile documents into a timeline document.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

It is difficult for any individual to track the evolution of a topic over time. At one end of the spectrum, a variety of breaking news items, recent scientific discoveries, new scientific papers, and other very recent items can overwhelm a user. These often come in clumps that can be too numerous for a user to sort through and absorb. These items are often rarely updated, instead new articles, papers, and so forth are written. At the other end of the spectrum, web pages (such as Wikipedia) memorialize the "final" state of events and information and are rarely, if ever, updated.

The embodiments disclosed herein include architectures, systems, methods, and so forth to create a timeline document that tracks the evolution of information over time. The timeline document contains periodic entries that distill the information available on a topic over a period of time (e.g., a day, week, and so forth). A user presented with the timeline document can see the evolution of a topic over time and can easily track the changes that happen over time. Furthermore, timeline documents are linked by anchor points that help users see connections between timelines. Topics and events captured in timeline documents can temporarily overlap, split, merge and/or be related in other ways. Anchor points allow a user to pivot to related topics in other timelines. Thus, anchor points represent connections between two or more timeline documents and allow users to better explore and understand related events and topics.

Embodiments disclosed herein utilize social media as an index into underlying content or shared content. Social media provides a platform for users to share articles, documents, new stories, and so forth created by others. Thus, activity on social media can stand as a proxy for popularity, importance, and so forth to help identify what is important about a particular topic for a given period of time. Social media also provides an effective way to track how a topic evolves over time.

Embodiments gather documents from a social media platform over a period of time (day, week, etc.). Social media documents are referred to by different names, depending on the underlying social media platform. Thus, social media documents may be referred to as tweets, posts, entries, messages, and so forth depending on the terminology commonly associated with the underlying social media platform. In this disclosure these will all be referred to as documents.

Once a collection of social media documents has been identified, the system sorts the collection by topics, thus creating sets of documents, each with at least one common topic. For a given set of social media documents, the system extracts a contextual vector comprising at least one representative n-gram that describes the set of documents. The system also extracts out linked documents (i.e., entities, the underlying news articles, scientific articles, etc.) and ranks the linked documents according to one or more criteria such as number of retweets, number of likes, number of clicks, set relevance (i.e., relevance to the set of documents), and so forth.

The timeline entry is created using a voting scheme that calculates a selection score based on the similarity of the n-grams in the context vector with respect to metadata associated with the linked documents (i.e., title, path, description and so forth). Once the linked documents that will be incorporated into the entry have been selected based on the selection score, the entry is created in the timeline document and contains a title, a description, links to the linked documents, topics, points of view, supporting documentation (original social media document(s) and so forth), and other metadata. The timeline document can be presented to a user through a search service such as a general internet search service or in other ways. Users can also choose to select particular points of view, or filter information from the timeline document in a variety of ways to get the information of interest. The timeline document thus contains information that shows the development of a topic over time.

Entry points of different timeline documents can be linked where appropriate to indicate a nexus between different topics. Users can use the linked entry points to move between related topics.

Description

FIG. 1 illustrates an example architecture 100 of a system to compile documents into a timeline document. The timeline document contains a series of entries that show the development of a particular topic over time. In this disclosure the term "topic" is a broad term intended to indicate a subject of a collection of related documents. For example, a topic might be "Brexit" referring to the decision by British citizens to exit the European Union or "Solar Energy" or any other topic.

Social media, such as social media service(s) 104, provides a platform for users to share articles, documents, new stories, and so forth created by others. Thus, activity on social media can stand as a proxy for popularity, importance, and so forth to help identify what is important about a particular topic for a given period of time. Social media activity also provides an effective way to track how a topic evolves over time.

Embodiments utilize documents 110 from a social media service(s) 104 over time (number of hours, day, week, etc.) to summarize and track the evolution of a topic over time. Social media documents 110 are referred to by different names, depending on the underlying social media platform. Thus, social media documents 110 may be referred to as tweets, posts, entries, messages, and so forth depending on the terminology commonly associated with the underlying social media platform. In this disclosure these will all be referred to as documents or social media documents 110.

Users share social media documents 110 using one or more user devices 102. Social media documents 110 often link to or refer to content (e.g., documents) 108 created by other individuals or services 106. Thus, a user may share an article or news story the user found particularly interesting over social media and in so doing creates a social media document 110 that links to another document 108 (web page, article, paper, etc.) from another service 106 (website, document sharing service, news service, etc.).

The document service 112 collects the social media documents 110 for a period of time (number of hours, day, week, etc.) and based on the information in the social media documents 110, the users that created or interacted with the social media documents, the linked documents 108 and other information, creates an entry in a timeline document 114. Each entry in the timeline document 114 contains a summary of the topic for that period of time along with supporting documentation of the important happenings for that topic during that time period. The entry for that time period can also contain the various points of view of the various documents for that time period.

Points of view are perspectives or stance of a particular document or collection of documents. Taking the above topic of "Brexit" as an example, the documents for a particular day may contain a political point of view, an economic point of view, an immigration point of view, and/or other points of view. A single document may contain one or more than one point of view, such as a news article discussing not only the political ramifications of the Brexit decision but also the projected economic impact or a story presenting both the "for" and "against" point of view. By capturing not only a summary but also the underlying documents along with their points of view, a user exploring a timeline document can "filter" the information in a timeline document to see what information is available for different points of view or explore multiple points of view.

As a representative example, consider a timeline document related to the topic of "solar energy." The various entries in such a document may contain information from various points of view such as technical advances, technology used in solar energy harvesting, the economics of solar energy, the political debate around solar energy, laws that are being proposed that impact solar energy, user satisfaction with solar energy, and many other points of view. A user can use the timeline document to pull out only points of view of interest and the timeline document would then present a series of timeline entries showing how that particular point of view evolves over time.

Timeline documents can also contain anchor points that create a nexus with other timeline documents. These anchor points represent links that connect entries of multiple timeline documents. For example, consider a timeline document that follows the development of the topic "Boston Red Sox" over time. When the Boston Red Sox play the Detroit Tigers, a potential anchor point occurs between the timeline document for the topic "Boston Red Sox" and the timeline document for the topic "Detroit Tigers." Basically, an anchor point can occur where an intersection of two topics occur. Anchors thus represent a related story at a particular time (i.e., entry point) that allows a user to pivot and explore a different topic.

As timeline documents 114 are created, they can be stored in a data store and explored in a variety of ways. In one representative example, a query service 116 such as an internet search service or other search service, can be used to present relevant timelines (i.e., timeline documents) to a user. Thus, if a user searches for "solar energy costs," the query service 116 can return a standard set of search results along with one or more timeline documents that relate to the search. In this case, a timeline document of "solar energy," "energy costs," and/or other related timeline documents can be returned and incorporated into the other search results.

In another representative example, query service 116 can be used to extract aspects of the timeline document 114 itself and/or multiple timeline documents. For example, a user, service, or other entity may submit queries to extract information. Representative queries may be to:

Select entries that are recent (last N entries);
Select the top N entries (i.e., as measured by popularity, or some other metric);

Select entries by length (i.e., select N entries that fall into a given length range);
Select all entries;
Select entries by date (i.e., entries that fall between two dates or that are after or before a given date);
Select entries by point of view;
Combinations thereof.

Figure 2:
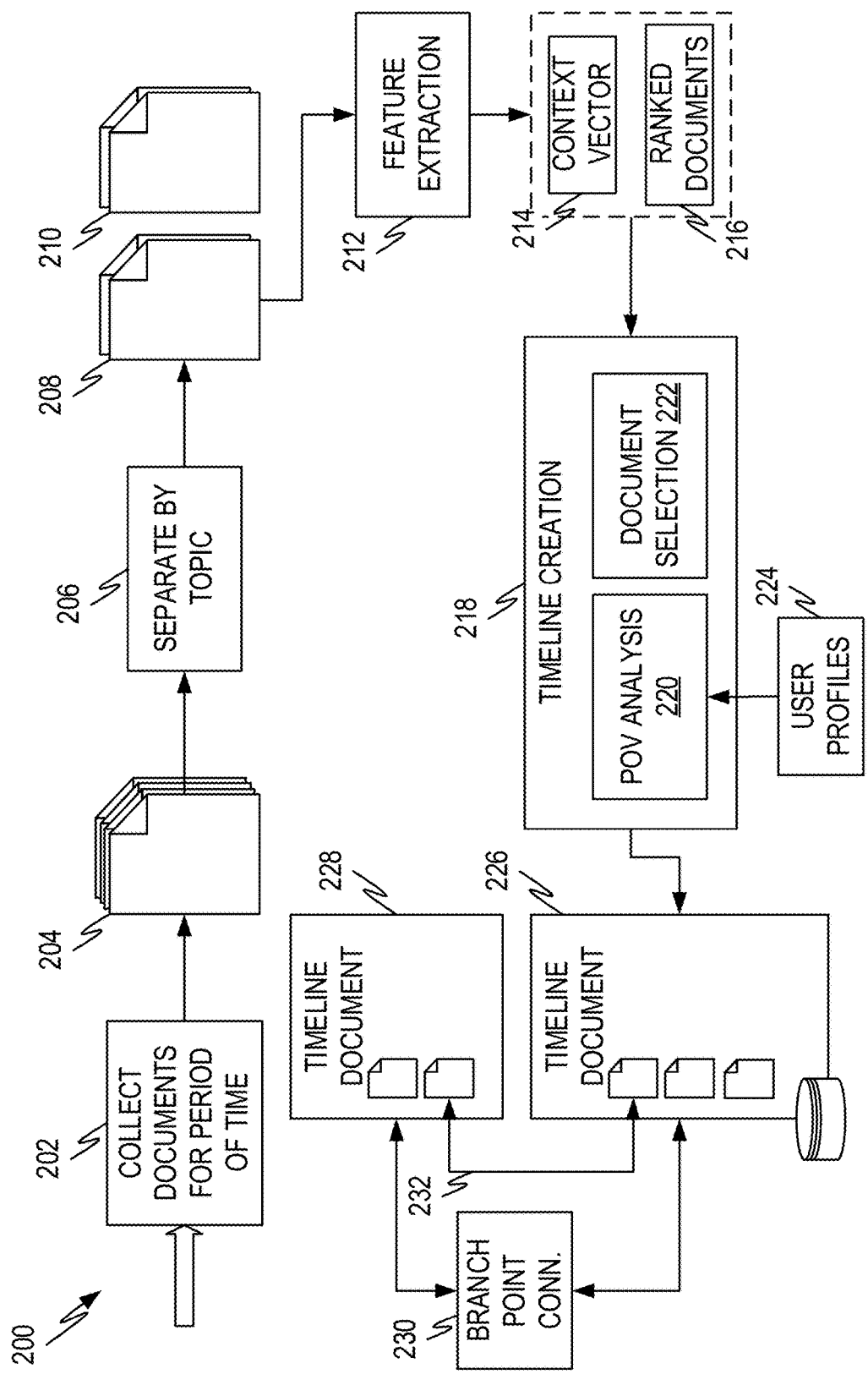
FIG. 2 illustrates an example diagram illustrating creation of a timeline document.

FIG. 2 illustrates an example diagram 200 illustrating creation of a timeline document. The process starts with operation 202 where social media documents 204 from one or more social media services are collected for the time period that will form an entry in one or more timeline documents. This can be a day, a week or any other desired time period. Furthermore, the time periods for entries in a timeline document do not have to be spaced uniformly (i.e., all entries need not cover the same time periods). For example, when a topic has a lot of information associated with it and the topic is developing quickly, the time period can be selected to be relatively short (i.e., a number of hours or a day). Often over time, the amount of information associated with a topic falls. As interest and the amount of information (i.e., number of documents created) falls, the time period can be lengthened (i.e., a week or a month). If interest rekindles, due to new events or new information, the time period can be shortened again.

Each of the social media documents 204 comprise a plurality of metadata such as a topic(s) (i.e., one or more hashtags), a source (i.e., account from which the social media document originated), a title, the content (text, pictures, etc.), external links (i.e., links to other documents), source of the linked document, domain of the linked document, description of the linked document, metrics (number of retweets, number of likes, etc.), and so forth. The social media documents 204, along with the metadata for each document, are used to create the individual entries of the timeline document.

Once the social media documents 204 for the desired period have been collected, the documents are separated by topic in operation 206. The topic of a document can be identified in a variety of ways including inspecting the documents for a title, looking for keywords in the document, and so forth. In social media, hashtags are often used by individuals to identify topics for their social media postings, tweets, and so forth. Hashtags can thus be used as a good proxy for a topic in social media documents. In one embodiment, operation 206 separates the social media documents 204 into topics by hashtags. This creates one or more groups of documents 208, 210. As social media documents often have numerous hashtags, a single document may appear in multiple groups.

After the documents have been separated by topic, operation 212 performs feature extraction on the groups of documents. Feature extraction 212 is to extract a context vector 214 comprising representative n-grams for the group of documents 208. The representative n-grams describe the group of documents 208 and can comprise a title, description, and/or other metadata that describe the group of documents 208. The extraction of representative n-grams is discussed further in conjunction with FIG. 4 below.

Feature extraction operation 212 also extracts a list of linked documents. Linked documents are those documents that are linked to from the social media documents in the group 208. For example, the documents 108 represent linked documents. Feature extraction operation also ranks them according to a selected criterion or metric such as number of retweets, number of likes, number of clicks, relevance to the topic, or any other metric/combination of metrics that indicates importance and/or popularity of the linked documents. Thus, a list of ranked documents 216 is also created by feature extraction operation 212.

The context vector 214 and list of ranked documents 216 are used by timeline creation operation 218 to create an entry for the timeline document 226. The entry is created by first selecting the documents that will form the entry (operation 222) and then analyzing the point of view of the selected documents (operation 220) and creating an entry for the timeline document 226. As discussed below, determining points of view utilizes user profiles 224 in some embodiments. The entry contains links to the selected documents (plus title and description), entities and hashtags mentioned, user accounts and the different points of view on the documents.

Document selection operation 222 is based on a voting scheme that calculates a score based on the similarity of the context vector n-grams with respect to the title, path and description of the document as well as other information in some embodiments. Document selection operation 222 is discussed in greater detail in FIG. 6 below.

Point of view analysis operation 220 identifies one or more points of view for the selected documents. Points of view can be identified by evaluating the sender or creator of the document. Users (sender/creator) tend to have particular points of view that can be identified by clues in user profiles and evaluating their writings over time. Points of view can also be identified by evaluating the users that interact with a particular document. Thus, if a document is retweeted or otherwise forwarded by a number of economists, it is a good clue that the document has an economic point of view. Finally, points of view can be identified by direct evaluation of the document itself such as by evaluating keywords, title and other content. Identification of points of view is discussed further in FIG. 7.

Branch point connection operation 230 evaluates entries in a timeline document against entries in related timeline documents to identify entries that should be anchored to other entries as indicated by link 232. Anchors can be identified by similarity between two entries in different timeline documents, such as illustrated documents 228, 226. Creation of anchors is discussed in FIG. 8.

FIG. 3 illustrates example presentation UI 300 for a timeline document 302. In this representative example, the topic of the timeline document 302 is Microsoft. The timeline document 302 contains a plurality of entries (each row in the presentation), with each entry representing a summary of the items that were collected for a period of time.

Each entry may comprise a graphic 304 as a representative graphic for the entry. The graphics can be part of the information extracted, for example, by feature extraction operation 212 or timeline creation process 218 of FIG. 2. The graphic can be drawn, for example, from one of the documents (i.e., social media documents or linked documents) selected as part of the entry. In an example, the graphic can be drawn from the highest ranked document (social media document or linked document) selected as part of the entry.

Each entry also comprises a description and/or title 306. The description and/or title can be created from the representative n-grams for that entry or can be drawn, for example, from one of the documents (i.e., social media document or linked document) selected as part of the entry. As a representative example, the description and/or title can be drawn from the highest ranked document (social media document or linked document) selected as part of the entry.

In one representative example, the description and/or title is drawn from the same document as the graphic (also referred to as an image) 304.

Each entry also comprises a date 308. The date 308 can be the date of one of the documents selected as part of the entry (i.e., the same document as the title/description or graphic is drawn from). The date 308 can also be the "closing" date of the period of time the entry represents. Thus, if the entry represents a month, the date can be the last day of the month for which documents were collected and analyzed to create the entry. Other dates can also be used (in conjunction with one of the dates mentioned or as an alternative to the dates mentioned) such as the beginning date of the time period represented by the entry.

Each entry also comprises one or more topics 310. In the illustrated example, the topic is represented by a hashtag. The hashtag/topic can be drawn from one of the documents selected for the entry, the document used for the title/description, the document used for the graphic, the most common topic for the selection of documents that make up the entry, or any other topic that is representative of the entry.

The entries of the timeline document 302 are presented as links in some embodiments so that a user can click on an entry and drill down into the individual information that makes up the entries, such as the documents selected for that entry, supporting evidence, and so forth. Anchor points can also be represented as a link in an entry, such as a link on the topic field or another field.

Figure 4:
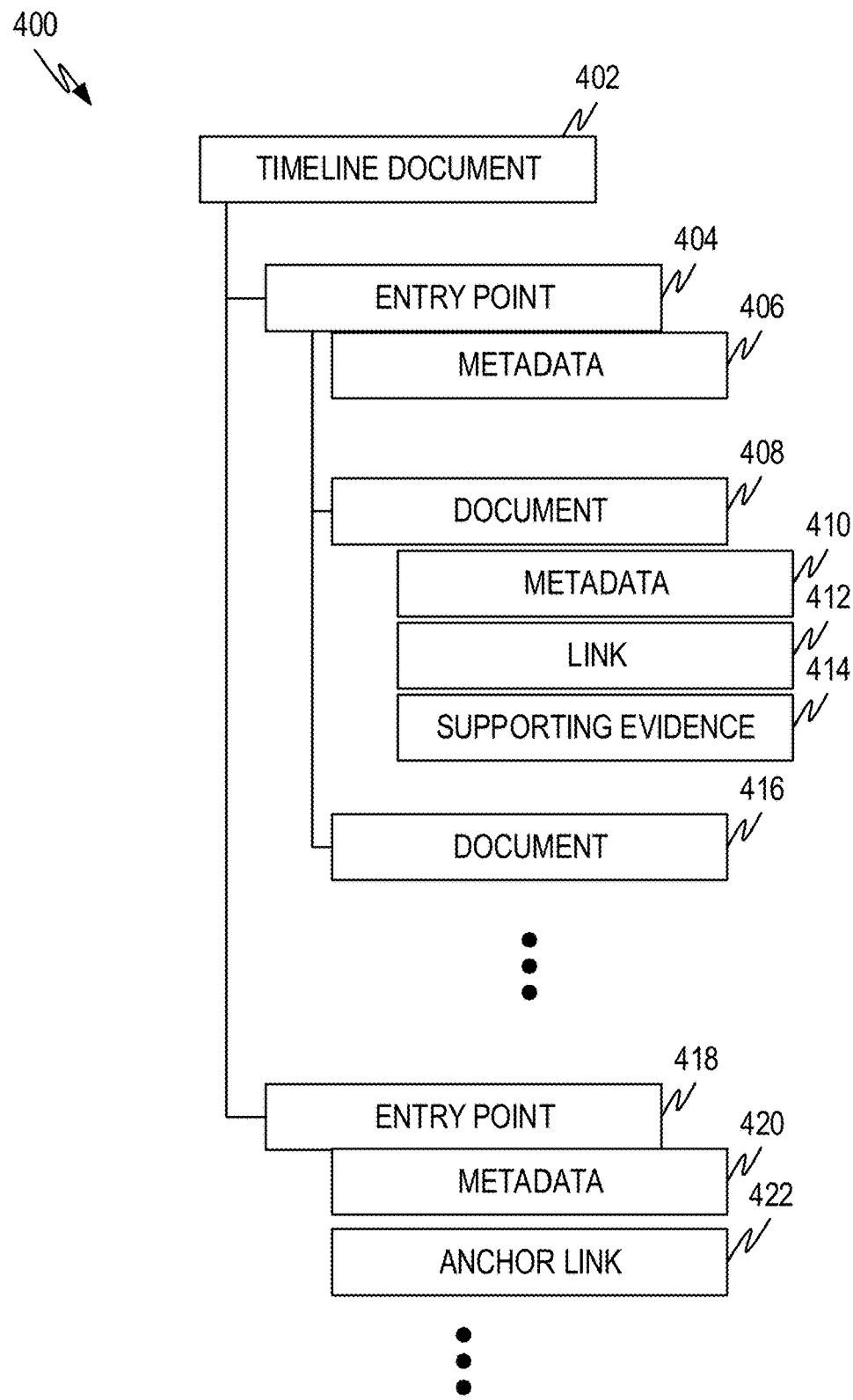
FIG. 4 illustrates example data structures of a timeline document.

FIG. 4 illustrates example data structures 400 of a timeline document 402. Although FIG. 4 presents the data structures of a timeline document as individual data structures linked together in a larger data structure, a timeline document 402 can also be a synthetic document in the sense that the individual data structures (entries, etc.) are loosely associated by links or other structures indicating relationships without actually compiling the individual data structures into a single document. In other words, the timeline document 402 can either be a single data structure with various sub-components/data structures or can be a collection of data structures associated by links or other storage.

A timeline document 402 comprises one or more entry points 404, 418. Entry points are the individual entries discussed above and are created by evaluating a collection of documents for a given period of time as discussed herein.

An entry point 404 comprises a plurality of items. For example, an entry point can comprise one or more of: metadata 406, 420 for the entry point; one or more documents 408, 416; an anchor 422 that contains a link to another entry in one or more other timeline documents; and/or in some embodiments other information. Metadata for an entry point is represented, for example, as 406 and 420 while the anchor points are represented by 422.

The metadata 406 for an entry point 404 comprises one or more of the items discussed in conjunction with FIG. 3, such as a graphic, a description/title, a date, and/or a topic and/or links associated with any of these items.

As discussed herein, each entry 404 in the timeline document 402 comprises a number of selected documents. In FIG. 4, each of these documents are identified by a document structure 408. The document structure 408 comprises one or more of: metadata 410; link(s) to linked documents 412; supporting evidence 414; and/or other information Metadata 410 comprises different information about the selected document. In embodiments of the disclosure, metadata 410 includes one or more of: representative n-grams describing the document; title; description; date(s) of the document; hashtag(s); points of view; metrics associated with the social media document that contained the linked document (retweets, likes, etc.); and/or other metadata.

The document structure 408 also comprises link(s) 412. These links can link to documents that were originally linked to in the social media document and can be the links discussed above in conjunction with FIG. 3 that retrieves the associated document(s).

The document structure 408 also comprises supporting evidence 414. Supporting evidence can comprise the original information used to create the document entry, such as the original social media document(s), the linked document(s), the metadata associated with the original social media documents/liked documents and so forth. Thus, the supporting evidence can include all or part of the raw data used to create the document entry.

Figure 5:
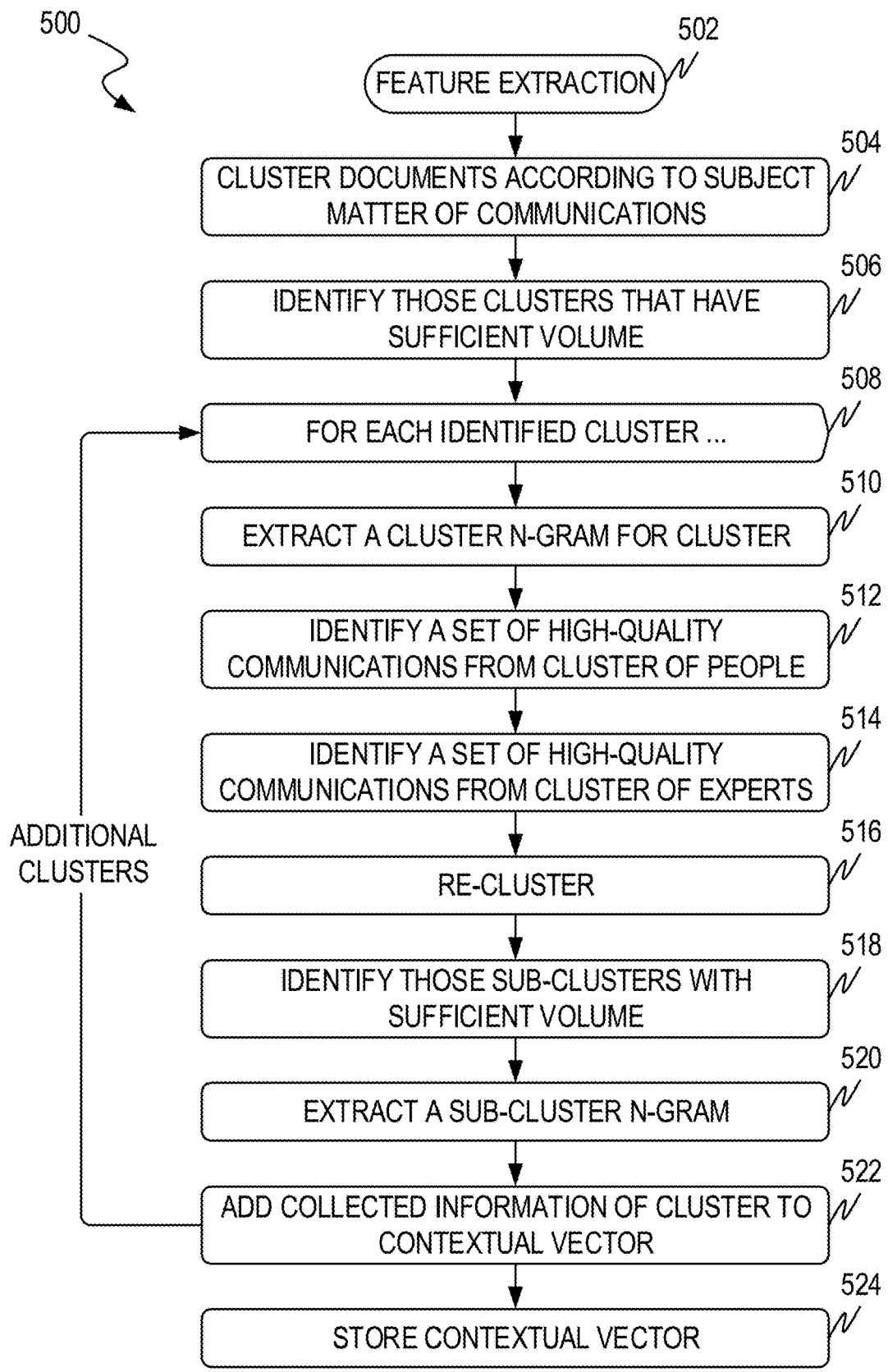
FIG. 5 illustrates an example flow diagram illustrating feature selection.

FIG. 5 illustrates an example flow diagram 500 illustrating feature selection to extract a context vector 214 and/or a list of ranked documents 216. Execution starts at operation 502 and proceeds to operation 504 where the group of selected social media documents is clustered according to the subject matter of the documents. According to various aspects of the disclosure, one or more hashtags can be used as the subject matter of a document. As those skilled in the art will appreciate, a hashtag typically refers to the symbol "#" immediately following by text, the text being the subject matter of the hashtag. For example, "#charliehebdo" is a hashtag that makes reference to "Charlie Hebdo." Similarly, "#MemorialDay2015" is a hashtag reference to Memorial Day, 2015. Of course, the subject matter of a social media document is not limited to a hashtag within the document as, of course, there are documents that do not include hashtags but are relevant documents to be included in the group. Thus, according to additional and/or alternative embodiments of the disclosed subject matter, various techniques for determining the subject matter of a document may be used, including by way of illustration and not limitation: dominant and/or popular n-grams of the social media documents, semantic analysis of the social media documents, and the like.

Since hashtags are created by users there are no requirements or guidelines on how to create and apply hashtags. Thus, often when breaking stories happen, there may be multiple or competing hashtags that apply to the same topic. As described herein, hashtags can be analyzed, for example based on the documents that they apply to, and common topics identified by clustering techniques, semantic analysis, and/or other methods.

In addition to identifying the subject matter (one or multiple topics) of a document, a clustering of the document according to subject matter is made. As with identifying the subject matter of the document, clustering may be completed according to a variety of techniques that include, by way of illustration and not limitation, one or more of: Jaccard similarity (also called Jaccard index), Cosine similarity, Agglomerative clustering, K-means, DBSCAN, Term Frequency-Inverse Document Frequency (TF-IDF), and the like. As with determining the subject matter, the clustering may be based on n-grams constructed from the various documents. Furthermore, the clustering can result in a document being associated with more than one cluster (and hence, more than one subject matter).

Irrespective of the particular algorithms and/or techniques used to identify the subject matter and conduct the clustering of the documents, the result is a set of clusters of documents, each cluster representing a particular topic (subject matter).

Thus, at operation 506, those clusters that are determined to have sufficient volume are identified. Identification/selection of the clusters determines what topics are to be identified within the context vector for the corresponding time period.

According to various aspects of the disclosed subject matter, a cluster may have "sufficient volume" if the number of documents within the cluster exceeds a predetermined threshold, or if the number of documents within the cluster exceeds a predetermined percentage of all of the documents for the time period. Alternatively and/or additionally, a cluster may be identified as having "sufficient volume" according to a threshold number: i.e., a predetermined number of clusters that have the most documents. For example, for a given time period, the feature extractor 212 may select the top 4 clusters/topics having the most documents. Further still, the number of clusters identified may be made according to those clusters that have the most documents volume where, collectively, the identified clusters represent at least a predetermined percentage (e.g., 50%) of all documents of the time period. Still further, the clusters may be identified according to multiple elements of the criteria mentioned above as well as additional selection criteria.

With regard to operations 504 and 506, according to aspects of the disclosed subject matter, one of the motivations of clustering is to identify those topics that have sufficient value. However, in various alternative embodiments, topics could be made available from an external source, i.e., external from the clustering/selection described above. For example, topics could be provided according to information derived from search logs of a search engine, according to trending topics as discovered or reported by a social networking site, or even human-curated topics. In this alternative embodiment, rather than clustering all of the documents and selecting those clusters having significant/sufficient volume, the documents could be filtered according to the predetermined topics. Thus (while not shown), rather than clustering and identifying topics from clusters, steps may be taken to identify (filter) the documents that correspond to the pre-determined topics.

Once the clusters (and topics) are identified, at block 508 an iteration loop is begun to iterate through the identified clusters to determine specific information of the cluster that will be maintained in the context vector for the corresponding time period. As shown in FIG. 5, the iteration includes operations 510-522. At operation 510, the topic of the cluster is extracted. Typically, the subject matter/topic that is used in clustering the documents. In addition to the topic, one or more images representative of the topic, as posted by one or more of the people posting the social media document regarding the topic, may also be identified. Indeed, while according to various embodiments, a single image representative of the topic may be selected, in alternative embodiments there may be plural representative images selected. According to various aspects of the disclosed subject matter, the one or more representative images may be selected from among the social media documents according to various popularity criteria including, by way of illustration and not limitation, the number of social media documents indicating a favorable impression of an image (e.g., "likes") during the time period, the number of times an image is shared via social media documents during the time period (retweets, forwards, reposts, etc.), the number of references (e.g., hyperlinks) made to an image during the time period, and the like.

In addition to identifying the topic of the cluster and a representative image (or images), at operation 512, a threshold number of high-quality social media documents, as submitted by "ordinary" people, i.e., non-experts, are identified/selected from the cluster. These selected social media documents from "ordinary" people are social media documents from people that are not viewed as being an expert in the topic, but rather part of the general populace of people that are communicating in the social sphere. While these "ordinary" people are not viewed as being experts, some criteria may be applied to identifying and selecting high-quality communications, such as selecting communications that use grammatically correct structure, a social communication with a significant number of indications of preference, popular reposts (information originated by one person and reposted/communicated by another), the clarity and/or thoroughness of a social communication with regard to the topic, first-hand presence at a reported event, and the like. According to various embodiments of the disclosed subject matter, the threshold number of selected high quality social media documents may be relatively small, such as 5 or 6. However, the actual threshold number or range of numbers may be modified up or down to meet specific implementation details and criteria.

In addition to identifying/selecting high quality social media documents of "ordinary" people from the currently processed cluster, at operation 514 a second threshold number of high quality social media documents are identified from the cluster that were posted by people generally acknowledged by those familiar in regard to a topic, or specifically qualified according to background, training and/or experience as having expertise (experts) or highly relevant information with regard to the topic or domain of the topic. In particular, based on these and other qualifying criteria, an expert is a person (or, sometimes, an organization) that is viewed and acknowledged as having expertise and/or substantial knowledge within the particular domain, either by his or her peers within the domain, or among a significant population of people interested in the domain and/or topic. For example, if the topic is in regard to an election, a social media document in the cluster from a well-known, respected political analyst may qualify as a high quality social media document due to training and expertise in the area. As with the previous group of selected social media documents, communication criteria such as clarity of information, relevance to the subject, grammatical correctness, and the like may all be applied in selecting the threshold number of social media documents from the cluster of people viewed as being expert or having expertise, or highly relevant and/or specific information, in regard to the topic. According to various embodiments of the disclosed subject matter, the threshold number of high quality social media documents of experts will typically be relatively small, such as 4 or 5 corresponding to the social media documents of 4 or 5 experts each commenting on the topic. However, the actual threshold number or range of numbers may be modified up or down to meet specific implementation details and criteria.

While routine 500 describes obtaining high-quality social media documents from both experts and non-experts in an effort to describe what "ordinary" people are saying as well as what the "experts" are saying in the particular time period, it is a reflection of one embodiment of the disclosed subject matter and should not be viewed as limiting upon the disclosed subject matter. Indeed, in alternative embodiments, a context vector may obtain a single set of high-quality social media documents from the corpus of social media documents for the particular time period irrespective of whether the originating person is considered an expert or an ordinary person commenting on the topic.

As illustrated at operation 516, according to the illustrated embodiment, the currently iterated cluster of social media documents is re-clustered (according to one or more clustering techniques including those described above) in order to identify sub-topics within the current cluster. Thus, at operation 518, those sub-clusters that include, e.g., a threshold volume of social media documents within the sub-cluster, a threshold percentage of the volume of social media documents of the cluster within the sub-cluster, and/or a threshold number of sub-clusters that have the greatest volume of social media documents, are identified and, at operation 520, the sub-topic of the identified sub-clusters are extracted.

While not shown, as an alternative to re-clustering a cluster to find sub-topics, related topics could be identified among the non-selected clusters but which are, in some manner, similar to the selected cluster for which social sketch information is to be generated. The topics corresponding to the related clusters are then used as related/sub-topic information associated with the social sketch. According to various embodiments, these related clusters may be determined by looking for similar clusters (i.e., according to the similarity measure used when clustering), whether there is some degree of overlap among the entities described in social media documents, whether there are common hyperlinks among the various social media documents of two or more clusters, and the like.

At operation 522, the information described above identified from the currently processed cluster, i.e., a cluster set, is added to the context vector for the corresponding specified time period. Thereafter, if there are additional main clusters to process, the iteration returns to operation 508 to repeat operations 510-522. At operation 522, once all of the identified clusters have been processed, such that the extracted/identified information is added to the context vector corresponding to the specified time period, the routine 500 proceeds to operation 524 where the context vector (corresponding to the specified time period) is stored in a data store. Thereafter, the routine 500 terminates.

In regard to the various information identified from each cluster (which forms a cluster set) that is added to a context vector for a specified time period, it should be appreciated that while the cluster sets of the illustrated routine 500 include representative images, sub-topics, high-quality expert communications and high-quality non-expert communications, in various alternative embodiments the particular sets of information may vary. For example, in one embodiment, a cluster set may comprise only a representative image and a larger amount (e.g., 10) high quality non-expert social media documents. In another alternative embodiment, a cluster set may comprise a representative image for the cluster, representative images for each of the sub-topics, and high-quality social media documents (without regard to whether the social media documents are from experts or non-experts.) Accordingly, while routine 500 of FIG. 5 presents a routine for generating context vectors based on cluster sets of a particular configuration, this should be viewed as illustrative and not limiting upon the disclosed subject matter.

Figure 6:
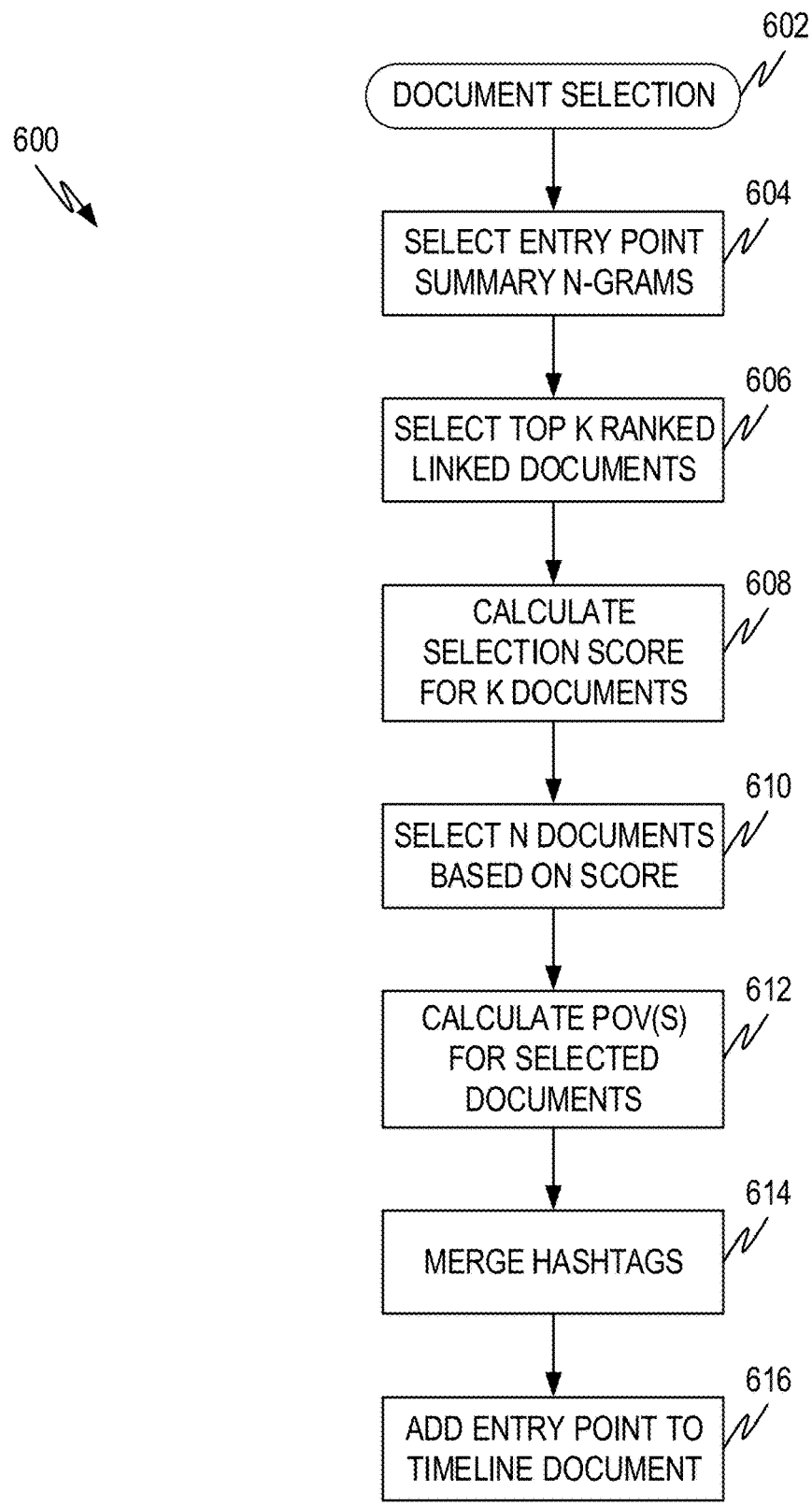
FIG. 6 illustrates an example flow diagram illustrating document selection.

FIG. 6 illustrates an example flow diagram 600 illustrating document selection. The document selection method of FIG. 6 identifies which linked documents will be selected as part of the entry in the timeline document for the time period. The method illustrated in FIG. 6 uses a voting scheme that calculates a score based on the similarity of linked documents to the n-grams in the context vector generated as discussed herein.

The method begins at operation 602 and proceeds to operation 604. At operation 604, the appropriate n-grams are selected from the context vector. The n-grams that are selected are those that will be used to identify the linked documents that will be selected for the entry. The n-grams can be selected based on a variety of criteria. For example, in one embodiment, the n-grams are selected based on an importance or popularity criteria. This can be determined, for example, by metrics associated with the underlying social media documents from which the n-grams were drawn, such as retweets, forwards, likes, and so forth. N-grams can also be selected by selecting the n-grams that are most common. One measure of commonality is the number of times the n-grams are extracted from the underlying documents. Another measure of commonality is to identify the number of underlying social media documents in the cluster from which the n-gram was extracted. Other measures can also be used.

Operation 606 selects the top K ranked linked documents. As described in conjunction with FIG. 2 the linked documents are collected and ranked according to a selected criterion or metric such as number of retweets, number of likes, number of clicks, or any other metric/combination of metrics that indicates importance and/or popularity of the linked documents. Ranking simply places the linked documents in order of the associated metric. In some embodiments K can equal the whole list. In other embodiments K is selected to be less than the whole list. K sets the number of documents that will be considered for inclusion into the timeline entry.

Operation 608 calculates a selection score for each of the K ranked documents based on their similarity to the selected summary n-grams (operation 602). In one embodiment, the title, path (i.e., domain from which the linked document comes like BBC.com), description (typically the first paragraph of the linked document), and other information can be compared to the selected n-grams and a similarity score calculated. In some embodiments, the similarity score can be based on how many of the items match (i.e., which of the title, path, description, etc. match the selected n-grams). For example, a score can be assigned to each item that matches (or don't match) and the total score calculated as a sum or a weighted sum of the items scores. In other embodiments, the similarity score can be based on the degree of match between two items. For example, if an n-gram appears in the title, then a given score can be given to the match. If only a portion of the n-gram appears in the title, then a lesser score can be given. If multiple n-grams appear in the title, then a higher score can be given. One way to approach this is to create a vector with the document items (title, path, description, etc.) or with extracted n-grams of the document items and compare it to the context vector. The score can be a measure of the distance between the two vectors.

Once the selection scores for the top K documents have been calculated, then the linked documents can be selected based on the selection scores. In one embodiment, the linked documents with the top N scores are selected (operation 610) for the entry for the corresponding time period in the timeline document. In some embodiments, N can be fixed such as the top 10 or top 5 documents. In other embodiments, N can be set based on the total number of documents (i.e., a percentage of the total). In still other embodiments, N can be based on differences between the selection scores, such as selecting documents in the top x % of scores or selecting documents with an absolute score difference (from maximum or from the top score) less than a given threshold.

Once the documents are selected, the points of view for the documents can be calculated in operation 612. Points of view can be identified by evaluating the sender or creator of the document. Users (sender/creator) tend to have particular points of view that can be identified by clues in user profiles and evaluating their writings over time. Points of view can also be identified by evaluating the users that interact with a particular document. Thus, if a document is retweeted or otherwise forwarded by a number of economists, it is a good clue that the document has an economic point of view. Finally, points of view can be identified by direct evaluation of the document itself such as by evaluating keywords, title and other content. Identification of points of view is discussed further in FIG. 7.

Operation 614 merges the hashtags of the selected N to a representative hashtag or set of representative hashtags. Additionally and/or alternatively, operation 614 can merge topics associated with the selected documents into a representative topic or set of representative topics. This operation is designed to help stabilize the topics assigned and account for their evolution over time. As previously discussed, hashtags can be a good proxy for topics for a document (linked or social media). However, given hashtags are assigned by users, there may be competing hashtags associated with a single topic and it may take some time for them to stabilize or for the users of the social media to settle on which hashtag will "win" when there are multiple competing hashtags. When a topic is new, it is common to have competing hashtags, but less common as a topic evolves.

Hashtags that refer to the same topic can be identified by commonly linked content. Thus in operation 614 the hashtags associated with a social media document that link to a selected linked document form the relevant hashtag set for that document. By evaluating the hashtags associated with social media documents corresponding to the N selected linked documents, it may be possible to see which hashtag or set of hashtags are most common among the set of selected documents and merge the hashtags into the representative hashtag or set of representative hashtags based on how frequently they occur.

Operation 616 adds the entry point along with all the associated material (metadata, links, supporting evidence, etc. as previously explained) to the timeline document.

Figure 7:
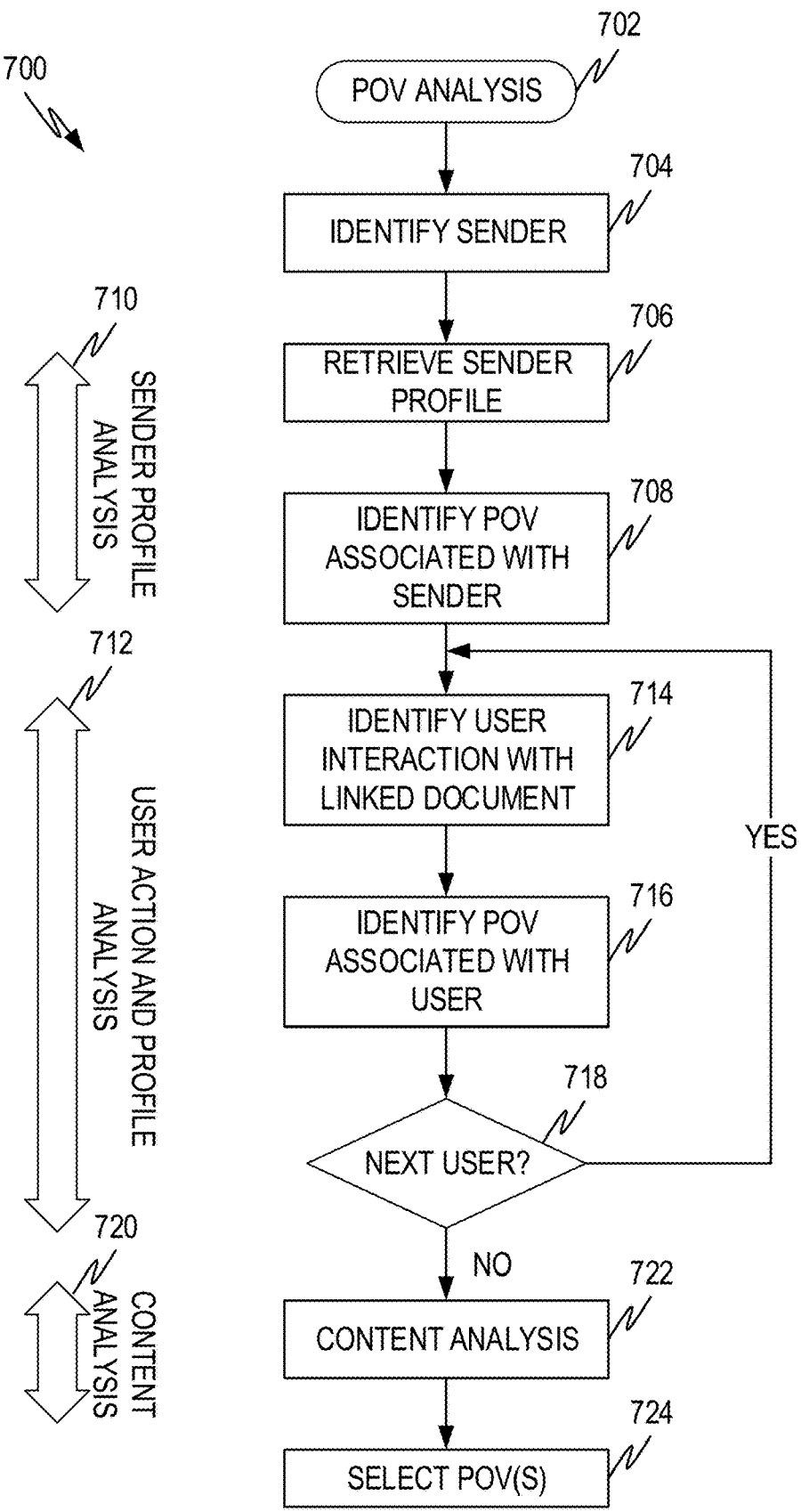
FIG. 7 illustrates an example flow diagram illustrating identifying point of view for documents.

FIG. 7 illustrates an example flow diagram 700 illustrating identifying points of view for documents. As indicated in the flow diagram 700, there are different ways in which points of view can be calculated. These include: 1) analysis of the sender/sender profile illustrated by arrow 710 and represented by operations 706 and 708; 2) analysis of user interaction with a document and user profiles illustrated by arrow 712 and represented by operations 714, 716 and 718; and 3) content analysis of the document illustrated by arrow 720 and represented by operation 722.

Not all embodiments will utilize all these methods. In some embodiments only one option (i.e., sender profile analysis) is used while in other embodiments multiple options (i.e., sender profile analysis and user action and profile analysis) are used. Embodiments may use these options in any combination. If multiple options are used, points of view can be selected based on a variety of criteria as explained below.

The point of view analysis begins with operation 702 and proceeds to operation 704 where the sender is identified. The sender can be an individual or can be an organization such as a news organization or company. User profiles of an individual may contain information that allows the point of view used in their writings to be determined. For example, a particular individual may be known as an expert in a field (see above for explanation on identifying experts) and may be known to have a particular point of view. In that situation, the user profile can be used to classify the potential points of view based on what the user tends to write about. A similar analysis works for non-individuals (institutions, companies, etc.) and can be built up over time. For example, articles from a particular news organization may be known for addressing primarily economic topics or technology topics. Other institutions may be known as more conservative or liberal. Thus, institutions can develop a profile that can be used to classify their points of view. In some cases, the point of view may depend on the topic so that some institutions tend to have one point of view for one topic and another point of view for another topic.

Thus, operation 706 retrieves a profile associated with the sender that has the relevant information stored therein and operation 708 identifies the point(s) of view associated with the sender. If that is the only methodology a particular embodiment uses, then execution can skip to operation 724 where the points of view that will be associated with a document are selected.

If an embodiment uses user actions and profiles to identify points of view, execution begins or proceeds (as the case may be) to operation 714 where user interactions with the document are identified. User interactions include, but are not limited to, any one or combination of: a user "liking" a document, retweeting a document, reposting a document, commenting on a document, forwarding a document, and/or otherwise indicating a preference for the document, a user reading a document, and so forth.

Once the interactions are identified in 714, the user profile of the user that interacted with the document can be retrieved and used to identify that user's point of view as explained above. Additional users can be identified in operation 718 and the process repeated until all the user points of view have been identified. As a representative example, if an article is shared (retweeted, etc.) by numerous economists, then it can be reasonably concluded that the article has an economic point of view. Similarly, if an article is commented on by a well-known technologist, the point of view likely includes technology.

At this point, if no additional methodology is to be used, then execution can skip to operation 724 where the points of view that will be associated with a document are selected.

If an embodiment uses content analysis of a document to identify points of view, then execution starts at, or proceeds to (as the case may be) operation 722, which represents the content analysis process. Content analysis can be performed using any number of methodologies to extract semantic information from a document. For example, certain words and phrases may be associated with a particular point of view. The frequency of occurrence of the words and phrases can identify a point of view associated with the document.

Words and phrases identified with a particular point of view can be identified by analyzing terms used by individuals having a particular point of view. Thus, if a user is known to have a particular point of view, the writings of the individual can be analyzed to extract words and phrases typically associated with the writings. This can be accomplished, for example, by looking at the co-occurrence of words and phrases across multiple documents. Looking at the writings of multiple individuals with a common point of view can also yield appropriate words and phrases, such as by using the co-occurrence of words and phrases across multiple documents from the multiple individuals.

Assuming no other methodologies are to be used to identify points of view, execution can proceed to operation 724 to select points of view to associate with a document.

Operation 724 selects at least one point of view from among all identified points of view to associate with the document. If the methodology/methodologies used to identify points of view have identified only a single point of view, then that point of view can be associated with the document. However, if multiple points of view have been identified, then operation 724 identifies which of the multiple points of view to associate with the document.

In some embodiments, all identified points of view are associated with the document. In other embodiments, one or more selection criteria are utilized to select which of the identified points of view will be associated with the document. In one representative example, an embodiment can identify a weighting factor associated with each point of view. For example, if user analysis (i.e., operations 706, 708 for sender profile analysis or operations 714, 716 and 718 for user action/profile analysis) identifies that a particular user has multiple points of view, then each of the points of view can have an associated weighting factor, for example based on the frequency that a user has that point of view. Thus, if 50% of the time a user writes on economics and 50% of the time a user writes on immigration, then the user analysis can identify both points of view with a 50% weighting factor. If, however, the multiple user action/profile analysis (operations 714, 716 and 718) identify 30% of the users have a technology point of view and 60% of the users have a legal point of view, then the technology point of view can have a 30% weighting factor while the legal point of view can be associated with a 60% weighting factor. Combinations thereof can also be used, so that if in the second example, if in the 60% segment of users, the users have a legal point of view 20% of the time and a political point of view 80% of the time, then the aggregate weighting factor can be 30% weighting factor for technology point of view, 12% weighting factor for a legal point of view and 48% weighting factor for a political point of view. Content analysis can also be applied to disambiguate between multiple points of view.

Weighting factors can also be calculated based on numbers, rather than frequency. Thus, if 20 users have interacted with a document and of the 20 users, 10 have point of view A, 5 have point of view B, 3 have point of view C and 2 have point of view D, then the weighting factors can be a normalized weight based on the number of users (i.e., point of view A has a 10/20=0.5 weighting factor and so forth). To the extent that users have multiple points of view, content analysis may be applied to disambiguate which point of view is associated with the document, or a relative frequency can be applied as in the prior examples (i.e., 10% of the time the user has point of view A, etc.).

Once all the weighting factors are calculated, then selection can be based on a threshold (i.e., weighting factors that exceed a given threshold), or based on some other criteria. For example, in one embodiment the top K points of view can be selected or the top X % points of view with the highest weights.

In another representative example, the system selects points of view that are "popular" or "trending" or "interesting" (even if their weights in the selected document are small). By analyzing all selected documents, the system can compute the most common points of view in general (e.g. by the amount of discussion, activity, retweeting, reposting, etc. generated by documents with these points of view) and select the popular/most common point of view for a given document. For example, a document might be associated mostly with economics and less with immigration, but if immigration is a "popular" point of view in general, then immigration is selected for that document.

In some settings, the end user who will consume the documents, points of view etc. is searching for something. For example, such a user can enter a query in a search engine as described herein or can subscribe receive news about certain topics. Alternatively, the user has certain interests, which can be explicitly specified by the user, or implicitly detected by the user's online behavior. In another representative embodiment, the points of view selected for the documents would be those matching what the user is searching for or the user's interests.

Once the point(s) of view have been selected, they are associated with the document.

Figure 8:
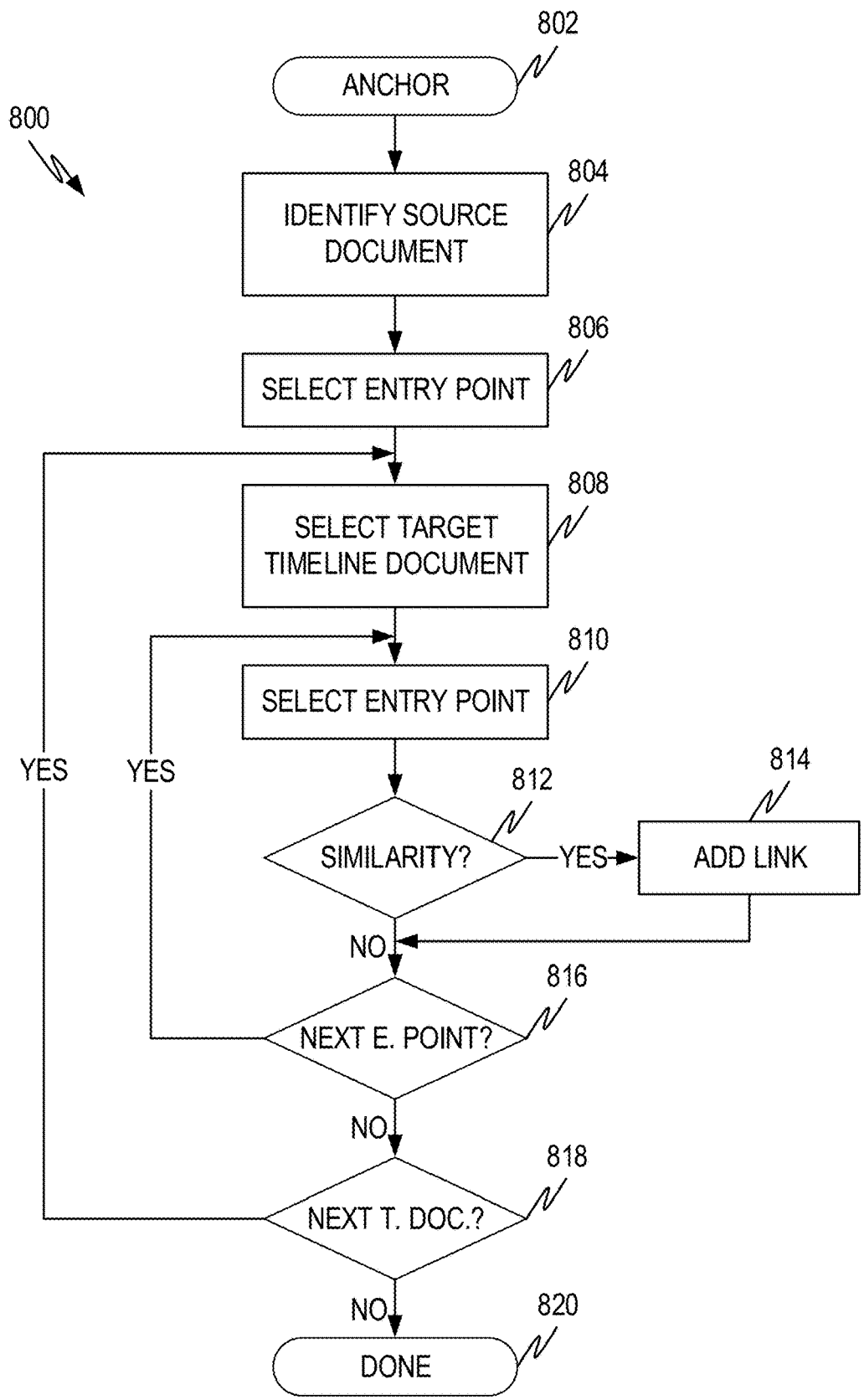
FIG. 8 illustrates an example flow diagram illustrating identifying and linking anchor points between timeline documents.

FIG. 8 illustrates an example flow diagram 800 illustrating identifying and linking anchor points between timeline documents. As previously mentioned, anchor points can be identified by similarities between entries in two or more timeline documents. A valid anchor point has an associated valid timeline document. In other words, embodiments of the disclosure will not create an anchor point to an empty timeline document or a timeline document with only a single entry. Using the document of FIG. 3 as an example, each displayed entry comprises an image 304, a description 306, a date 308 and a hashtag (topic) 310. In addition, entries may have multiple "non-displayed" items such as multiple hashtags, multiple documents, associated metadata and so forth. Thus, if only the highest ranked hashtag is displayed, the entry still may have multiple hashtags that aren't displayed. Similarity in the items of an entry (hashtag(s)/topics, description(s), date(s), other metadata, etc.) will indicate a potential anchor point.

The method of FIG. 8 begins in operation 802 and proceeds to operation 804 where a source timeline document is identified. Operation 806 selects an entry of the source timeline document to test for similarities.

Operation 808 selects a target timeline document and operation 810 selects an entry in the target timeline document. These operations (804, 806, 808, 810) can be executed as a separate process that runs over all timeline documents looking for potential anchor points. This approach has the advantage of being able to identify all possible links, but it also has the disadvantage of being computationally expensive as the number of documents and entries grow. Thus, embodiments can utilize logic to narrow the documents and entries that are compared. Narrowing can be done by date, by topic/hashtag or by other logic.

For example, after an entry is created (i.e., by operation 218 of FIG. 2 or by the other methods/operations described herein), the entry can be compared to other entries for the same or overlapping time periods to test for similarity. In other words, if an entry is for a time period ending on a particular date, only entries on that date or that include that date can be compared by some embodiments, thus limiting the anchor points to events and documents that are occur contemporaneously. Additionally and/or alternatively, entries can be filtered by topic/hashtag, n-gram, description, or some other criteria to limit the number of comparisons that happen.

Once two entries have been identified, operation 812 tests for similarity between the two entries. Similarity occurs when the entry data relates to each other, such as where topics/hashtags are the same (or where hashtags refer to the same topic), where descriptions are similar, and so forth. In this context, similarity in operation 812 does not necessarily mean identity. For example, where two hashtags are different, but analysis shows that they link to the same document, similarity of the hashtags can be declared. As another example, two descriptions may be different, but may contain overlapping n-grams. In this case, similarity can be declared as well. Additionally, combinations of identity and similarity can be used. As yet another representative example, if two topics are identical and if two descriptions are similar, then similarity of the entries can be declared. Finally, similarity is not limited just to displayed items (i.e., those items shown in FIG. 3), but similarity can be determined by comparing points of view, topics not displayed, users/sources of one or more documents, titles of documents not displayed, or any other type of metadata.

If operation 812 identifies similarity between the two entries, the "yes" branch is taken out of the operation and operation 814 adds a link (anchor) between the two entries.

Operations 816 and 818 loop over all appropriate entries and documents, respectively until there are no more entries that should be considered. The process terminates in operation 820.

The process can be performed for any number of source documents and entry points as discussed above.

The above description discusses how entries are created and placed into timeline documents. Timeline documents can be "closed" after a period of time when there is no activity on the document. Thus, some topics are very hot for a while and then pass out of the public discussion into history. For example, a timeline discussing the 2016 presidential campaign and election will be very busy during the campaign season and possibly for some time after the election. However, eventually, the campaign will no longer be discussed and no new information will arise for inclusion into the timeline. At this point, the timeline document can be closed and placed in an archive, or otherwise retired.

If activity on a closed timeline arises again, the timeline can be reopened and new entries created from the activity.

Example Machine Architecture and Machine-Readable Medium

Figure 9:
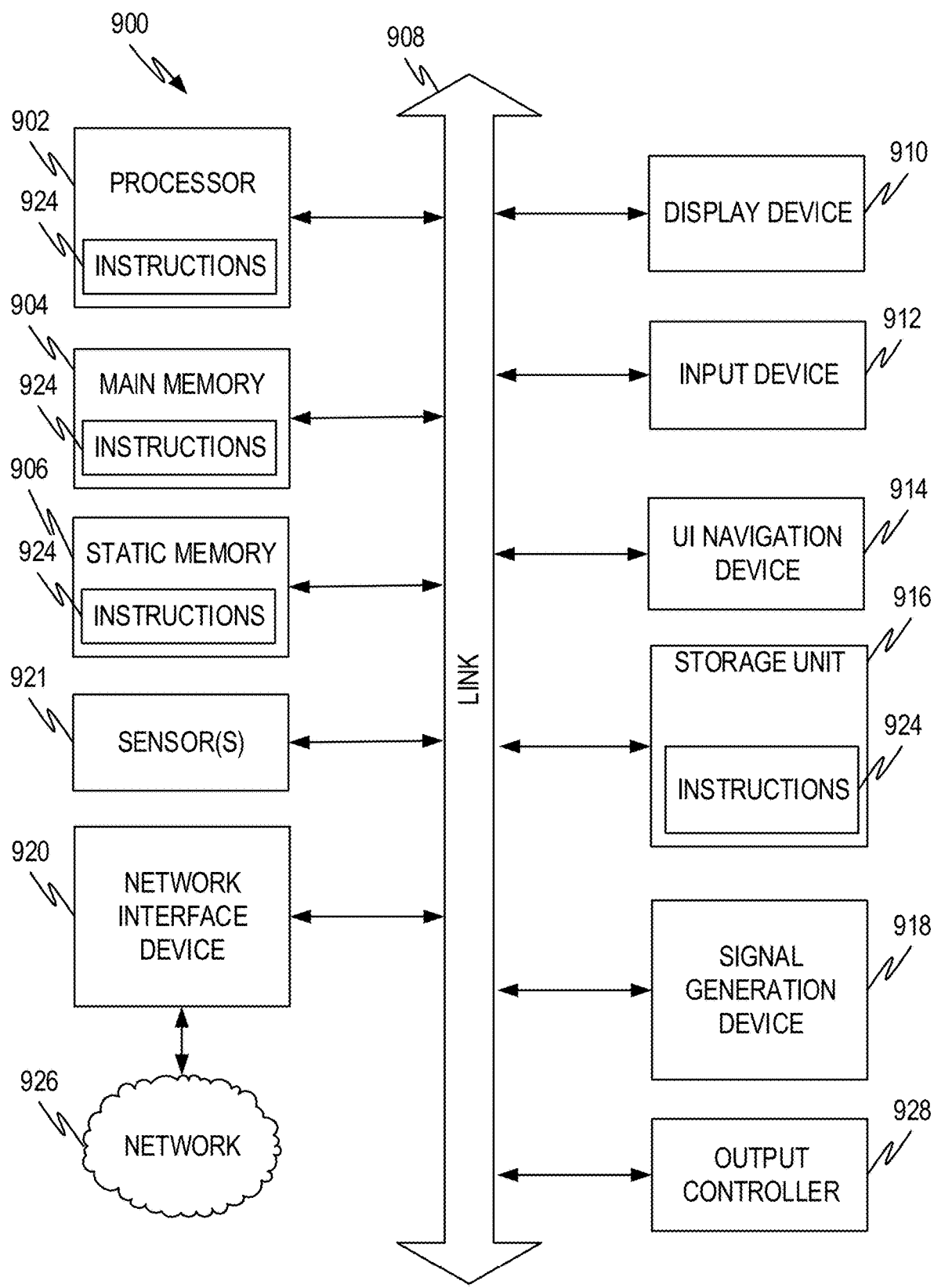
FIG. 9 illustrates a representative machine architecture suitable for implementing the systems and so forth or for executing the methods disclosed herein.

FIG. 9 illustrates a representative machine architecture suitable for implementing the systems and so forth or for executing the methods disclosed herein. The machine of FIG. 9 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 9 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 900 includes at least one processor 902 (e.g., a central processing unit (CPU), a graphics processing unit (GPU), advanced processing unit (APU), or combinations thereof), one or more memories such as a main memory 904, a static memory 906, or other types of memory, which communicate with each other via link 908. Link 908 may be a bus or other type of connection channel. The machine 900 may include further optional aspects such as a graphics display unit 910 comprising any type of display. The machine 900 may also include other optional aspects such as an alphanumeric input device 912 (e.g., a keyboard, touch screen, and so forth), a user interface (UI) navigation device 914 (e.g., a mouse, trackball, touch device, and so forth), a storage unit 916 (e.g., disk drive or other storage device(s)), a signal generation device 918 (e.g., a speaker), sensor(s) 921 (e.g., global positioning sensor, accelerometer(s), microphone(s), camera(s), and so forth), output controller 928 (e.g., wired or wireless connection to connect and/or communicate with one or more other devices such as a universal serial bus (USB), near field communication (NFC), infrared (IR), serial/parallel bus, etc.), and a network interface device 920 (e.g., wired and/or wireless).

Additionally, the device may connect over a network interface device 920 to one or more networks 926, such as a wireless or wired network.

Executable Instructions and Machine-Readable Medium

The various memories (i.e., 904, 906, and/or memory of the processor(s) 902) and/or storage unit 916 may store one or more sets of instructions and data structures (e.g., software) 924 embodying or utilized by any one or more of the methodologies or functions described herein. These instructions, when executed by processor(s) 902 cause various operations to implement the disclosed embodiments.

As used herein, the terms "machine-readable medium," "computer-readable medium" and "device-readable medium" mean the same thing and may be used interchangeably in this disclosure. The terms include a single medium or multiple media (e.g., a centralized or distributed database, and/or associated caches and servers) that store the one or more instructions or data structures. The terms shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The terms shall accordingly be taken to include, but not be limited to, solid-state memories, and optical and magnetic media. Specific examples of machine-readable media, computer-readable media and/or device-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. The terms machine-readable media, computer-readable media, and device-readable media specifically exclude non-statutory signals per se, which are covered under the term "signal medium" discussed below.

Signal Medium

The term "signal medium" shall be taken to include any form of modulated data signal and signals per se. The term "modulated data signal" means a signal that has one or more of its characteristics set or changed in such a matter as to encode information in the signal.

EXAMPLE EMBODIMENTS

Example 1

A method for capturing evolution of a topic over time as described by a set of documents, comprising:
accessing a set of first documents collected over a period of time from at least one social media service;
extracting, from the set of first documents, a contextual vector comprising a set of representative n-grams, the set of representative n-grams describing aspects of the first set of documents;
identifying a set of second documents linked to by the set of first documents;
ranking the set of second documents according to a selected criterion;
selecting a subset of the set of second documents based on similarity to at least a portion of the contextual vector; and
creating an entry into a timeline document, the entry comprising one or more of:
the subset of the set of second documents;
a point of view associated with at least a portion of the subset of the set of second documents;
a title;
a description; and
original documents from the first set of documents.

Example 2

The method of example 1, wherein the contextual vector comprises a topic.

Example 3

The method of example 1, further comprising calculating the point of view for each document in the subset of the set of second documents.

Example 4

The method of example 3, wherein calculating the point of view comprises:
identifying a sender of a document of the set of first documents;
accessing a profile associated with the sender;
identifying a point of view associated with the sender based on the profile; and
associating the point of view with at least one document of the set of second documents.

Example 5

The method of example 4, further comprising:
identifying a user that has interacted with the document of with the at least one document;
identifying a point of view associated with the user; and
associating the point of view with the at least one document.

Example 6

The method of examples 1, 2, 3, 4 or 5, further comprising:
identify an entry point in the timeline document;
selecting a second entry point in a target timeline document;
calculating a similarity score based on metadata associated with the entry point and metadata associated with the second entry point; and
adding a link between the entry point and the second entry point when the similarity score exceeds a threshold.

Example 7

The method of examples 1, 2, 3, 4 or 5, wherein selecting a subset of the set of second documents based on similarity to at least a portion of the contextual vector comprises:
calculating a selection score for at least K documents of the second set of documents; and
selecting as the subset of the set of second documents N documents having the highest selection scores of the second set of documents.

Example 8

The method of examples 1, 2, 3, 4 or 5, wherein extracting a contextual vector comprises:
clustering the set of first documents according to at least one subject matter;
identifying those clusters that have a number of documents over a threshold and, for each cluster so identified:
extracting an n-gram for the cluster and storing the n-gram as part of the contextual vector;
identifying a set of documents in the identified cluster from a cluster of individuals;
clustering the set of documents to identify sub-topics within the set of documents, the clustering defining a set of sub-clusters;
identifying sub-clusters of the set of sub-clusters that have a second number of documents over a second threshold and extracting a sub-cluster n-gram for each identified sub-cluster; and
storing each sub-cluster n-gram as part of the contextual vector.

Example 9

A computing system comprising:
a processor and executable instructions accessible on a machine-readable medium that, when executed, cause the system to perform operations comprising:
accessing a set of first documents collected over a period of time from at least one social media service;
extracting, from the set of first documents, a contextual vector comprising a set of representative n-grams, the set of representative n-grams describing aspects of the first set of documents;
identifying a set of second documents linked to by the set of first documents;
ranking the set of second documents according to a selected criterion;
selecting the top K documents of the ranked set of second documents as a subset of the set of second documents;
for each of the top K documents, calculating a selection score based on similarity to at least a portion of the contextual vector;
selecting N documents from the top K documents based on the calculated selection score; and
creating an entry into a timeline document, the entry comprising one or more of:

at least a portion of the selected N documents;
a point of view associated with at least a portion of the selected N documents;
a title;
a description; and
original documents from the first set of documents.

Example 10

The system of example 9, wherein the contextual vector comprises a topic.

Example 11

The system of example 9, further comprising calculating the point of view for each of the selected N documents.

Example 12

The system of example 11, wherein calculating the point of view comprises:
identifying a sender of a document of the set of first documents;
access a profile associated with the sender;
identify a point of view associated with the sender based on the profile; and
associate the point of view with at least one document of the set of second documents.

Example 13

The system of example 11, wherein calculating the point of view comprises:
identifying a user that has interacted with a document of the set of first documents;
identify a point of view associated with the user, based on a profile associated with the user; and
associate the point of view with at least one document of the set of second documents.

Example 14

The system of example 11, wherein calculating the point of view comprises:
analyzing content of a document of the second set of documents; and
based on keywords identified from the analyzing, identifying at least one point of view to associated with the document.

Example 15

The system of examples 9, 10, 11, 12, 13 or 14, further comprising:
identify an entry point in the timeline document;
select a second entry point in a target timeline document;
calculate a similarity score based on metadata associated with the entry point and metadata associated with the second entry point; and
add a link between the entry point and the second entry point when the similarity score exceeds a threshold.

Example 16

The system of examples 9, 10, 11, 12, 13 or 14, wherein extracting a contextual vector comprises:

clustering the set of first documents according to at least one subject matter;
identifying those clusters that have a number of documents over a threshold and, for each cluster so identified:
extracting an n-gram for the cluster and storing the n-gram as part of the contextual vector;
identifying a set of documents in the identified cluster from a cluster of individuals;
clustering the set of documents to identify sub-topics within the set of documents, the clustering defining a set of sub-clusters;
identify sub-clusters of the set of sub-clusters that have a second number of documents over a second threshold and extracting a sub-cluster n-gram for each identified sub-cluster; and
storing each sub-cluster n-gram as part of the contextual vector.

Example 17

A machine-readable medium having executable instructions encoded thereon, which, when executed by at least one processor of a machine, cause the machine to perform operations comprising:
access a set of first documents collected over a period of time from at least one social media service;
extract, from the set of first documents, a contextual vector comprising a set of representative n-grams, the set of representative n-grams describing aspects of the first set of documents;
identify a set of second documents linked to by the set of first documents;
rank the set of second documents according to selected criteria;
select the top K documents of the ranked set of second documents as a subset of the set of second documents;
for each of the top K documents, calculate a selection score based on similarity to at least a portion of the contextual vector;
select N documents from the top K documents based on the calculated selection score; and
create an entry into a timeline document, the entry comprising one or more of:
at least a portion of the selected N documents;
a point of view associated with at least a portion of the selected N documents;
a title;
a description; and
original documents from the first set of documents.

Example 18

The machine-readable medium of example 17, wherein the selected criteria comprises at least one of: number of likes; number of retweets; number of clicks; number of views; and combinations thereof.

Example 19

The machine-readable medium of examples 17 or 18, further comprising:
identify an entry point in the timeline document;
select a second entry point in a target timeline document;
calculate a similarity score based on metadata associated with the entry point and metadata associated with the second entry point; and add a link between the entry point and the second entry point when the similarity score exceeds a threshold.

Example 20

The machine-readable medium of examples 17 or 18, wherein extracting a contextual vector comprises:
cluster the set of first documents according to at least one subject matter;
identify those clusters that have a number of documents over a threshold and, for each cluster so identified:
extract an n-gram for the cluster and storing the n-gram as part of the contextual vector;
identify a set of documents in the identified cluster from a cluster of individuals;
cluster the set of documents to identify sub-topics within the set of documents, the clustering defining a set of sub-clusters;
identify sub-clusters of the set of sub-clusters that have a second number of documents over a second threshold and extracting a sub-cluster n-gram for each identified sub-cluster; and
store each sub-cluster n-gram as part of the contextual vector.

Example 21

A method for capturing evolution of a topic over time as described by a set of documents, comprising:
accessing a set of first documents 110, 204, 208, 210 collected over a period of time from at least one social media service 104;
extracting, from the set of first documents, a contextual vector 214 comprising a set of representative n-grams, the set of representative n-grams describing aspects of the first set of documents 110, 204, 208, 210;
identifying a set of second documents 216 linked to by the set of first documents;
ranking the set of second documents 216 according to a selected criterion;
selecting 222 a subset of the set of second documents based on similarity to at least a portion of the contextual vector 214; and
creating an entry 404 into a timeline document 402, 226, 228, the entry comprising one or more of:
the subset of the set of second documents 408, 416;
a point of view associated with at least a portion of the subset of the set of second documents;
a title;
a description; and
original documents from the first set of documents.

Example 22

The method of example 21, wherein the contextual vector comprises a topic.

Example 23

The method of examples 21 or 22, further comprising calculating the point of view for each document in the subset of the set of second documents.

Example 24

The method of example 23, wherein calculating the point of view comprises:

identifying a sender of a document of the set of first documents;
accessing a profile associated with the sender;
identifying a point of view associated with the sender based on the profile; and
associating the point of view with at least one document of the set of second documents.

Example 25

The method of example 24, further comprising:
identifying a user that has interacted with the document of with the at least one document;
identifying a point of view associated with the user; and
associating the point of view with the at least one document.

Example 26

The method of examples 21, 22, 23, 24 or 25, further comprising:
identify an entry point in the timeline document;
selecting a second entry point in a target timeline document;
calculating a similarity score based on metadata associated with the entry point and metadata associated with the second entry point; and
adding a link between the entry point and the second entry point when the similarity score exceeds a threshold.

Example 27

The method of examples 21, 22, 23, 24, 25 or 26, wherein selecting a subset of the set of second documents based on similarity to at least a portion of the contextual vector comprises:
calculating a selection score for at least K documents of the second set of documents; and
selecting as the subset of the set of second documents N documents having the highest selection scores of the second set of documents.

Example 28

The method of examples 21, 22, 23, 24, 25, 26 or 27, wherein extracting a contextual vector comprises:
clustering the set of first documents according to at least one subject matter;
identifying those clusters that have a number of documents over a threshold and, for each cluster so identified:
extracting an n-gram for the cluster and storing the n-gram as part of the contextual vector;
identifying a set of documents in the identified cluster from a cluster of individuals;
clustering the set of documents to identify sub-topics within the set of documents, the clustering defining a set of sub-clusters;
identifying sub-clusters of the set of sub-clusters that have a second number of documents over a second threshold and extracting a sub-cluster n-gram for each identified sub-cluster; and storing each sub-cluster n-gram as part of the contextual vector.

Example 29

The method of examples 21, 22, 23, 24, 25, 26, 27 or 28 wherein the first set of documents are selected based on a common hashtag.

Example 30

The method of examples 21, 22, 23, 24, 25, 26, 27, 28 or 29 wherein the subset of the set of second documents comprises N documents and wherein the N documents are selected based on a calculated selection score for each of the N documents.

Example 31

The method of examples 21, 22, 23, 24, 25, 26, 27, 28, 29 or 30 further comprising identifying the point of view associated with at least the portion of the subset of the set of second documents, comprising at least the operations:

identifying a document from among the subset of the set of second documents;

calculating a point of view for the document based on at least one of: a user profile associated with the sender of the document; a user profile associated with a user that has interacted with the document; or analysis of the content of the document; and associating the point of view with the document.

Example 32

The method of example 31, wherein identifying the point of view associated with at least the portion of the subset of the set of second documents, further comprises the operations:

calculating at least one additional point of view associated with the document based on at least one of: the user profile associated with the sender of the document; the user profile associated with a user that has interacted with the document; or analysis of the content of the document;

calculating a weighting factor for the point of view and each of the at least one additional points of view;

selecting at least one point of view from among the point of view and the at least one additional point of view based on the weighting factor; and associating the at least one point of view with the document.

Example 33

The method of example 32, wherein the weighting factor is based on at least one of: frequency of occurrence of a particular point of view or number of occurrence of a particular point of view.

Example 34

An apparatus comprising means to perform a method as claimed in any preceding claim.

Example 35

Machine-readable storage including machine-readable instructions, when executed, to implement a method or realize an apparatus as claimed in any preceding claim.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method for capturing evolution of a topic over time as described by a set of documents, comprising:

accessing a set of first documents collected over a period of time from at least one social media service, a subset of the set of first documents being in a linked relationship to a set of second documents different from the set of first documents;

extracting, from the set of first documents, a contextual vector comprising a set of representative n-grams describing aspects of the first set of documents, the contextual vector representing aspects used to select documents from the second set of documents;

collecting the set of second documents linked to by the subset of the set of first documents;

ranking the set of second documents according to a selected criterion;

selecting a first subset of the set of second documents based upon the ranking;

responsive to the ranking, selecting a second subset of the set of second documents based on calculated similarity scores that indicate, for documents in the first subset of the second set of documents, similarity to at least a portion of the contextual vector;

and creating an entry into a timeline document, the entry comprising one or more of:

the second subset of the set of second documents;

a title from a document in the second subset of the set of second documents;

a description from a document in the second subset of the second set of documents; and original documents from the first set of documents; and storing the entry into the timeline document.

2. The method of claim 1, wherein the entry into the timeline document comprises:

the subset of the set of second documents; and a point of view associated with the at least a portion of the subset of the set of second documents.

3. The method of claim 1, further comprising:

responsive to the selection of the subset of the set of second documents, calculating a point of view for each document of the subset of the set of second documents, wherein calculating the point of view is based on identifying a set of communications from a cluster of people.

4. The method of claim 1, further comprising:

responsive to the selection of the subset of the set of second documents, calculating a point of view for each document of the subset of the set of second documents, wherein calculating the point of view comprises:

identifying a sender of a document of the set of first documents;

accessing a profile associated with the sender;

identifying a point of view associated with the sender based on the profile; and associating the point of view with at least one document of the set of second documents.

5. The method of claim 1, further comprising:

responsive to the selection of the subset of the set of second documents, calculating a point of view for each document of the subset of the set of second documents, wherein calculating the point of view comprises:

identifying a user that has interacted with a document of the set of first documents or with a document of the set of second documents;

identifying a point of view associated with the user; and associating the point of view with the document of the set of second documents.

6. The method of claim 1, further comprising:

identifying an entry point in the timeline document;

selecting a second entry point in a target timeline document;

calculating a similarity score based on metadata associated with the entry point and metadata associated with the second entry point; and adding a link between the entry point and the second entry point when the similarity score exceeds a threshold.

7. The method of claim 1, wherein selecting the second subset of the set of second documents comprises:

calculating selection scores for the first subset of the second set of documents wherein the second subset of the second set of documents have the highest selection scores from amongst the first subset of the second set of documents.

8. The method of claim 1, wherein extracting the contextual vector comprises:

clustering the set of first documents according to at least one subject matter;

identifying those clusters that have a number of documents over a threshold and, for each cluster so identified:

extracting an n-gram for the cluster and storing the n-gram as part of the contextual vector;

identifying a set of documents in the identified cluster from a cluster of individuals;

clustering the set of documents to identify sub-topics within the set of documents, the clustering defining a set of sub-clusters;

identifying sub-clusters of the set of sub-clusters that have a second number of documents over a second threshold and extracting a sub-cluster n-gram for each identified sub-cluster; and storing each sub-cluster n-gram as part of the contextual vector.

9. A computing system comprising:

a processor and executable instructions accessible on a machine-readable medium that, when executed, cause the system to perform operations comprising:

accessing a set of first documents collected over a period of time from at least one social media service;

extracting, from the set of first documents, a contextual vector comprising a set of representative n-grams, the set of representative n-grams describing aspects of the first set of documents;

identifying a set of second documents linked to by the set of first documents;

ranking the set of second documents according to a selected criterion;

selecting a first subset of the ranked set of second documents responsive to and based on the ranking;

for each of the documents in the first subset, calculating a selection score based on similarity to at least a portion of the contextual vector;

selecting a second subset of documents from the first subset based on the selection scores; and creating an entry, the entry comprising one or more of:

at least one document of the second subset of documents;

a point of view associated with at least one document of the second subset of documents;

a title from at least one document of the second subset of documents;

a description from at least one document of the second subset of documents; and at least one document of the original documents from the first set of documents; and storing the entry into a timeline document.

10. The system of claim 9, wherein the contextual vector comprises a topic.

11. The system of claim 9, the operations further comprising calculating the point of view for each document in the second subset of documents.

12. The system of claim 11, wherein calculating the point of view comprises:

identifying a sender of a document of the set of first documents;

accessing a profile associated with the sender;

identifying a point of view associated with the sender based on the profile; and associating the point of view with at least one document of the set of second documents.

13. The system of claim 11, wherein calculating the point of view comprises:

identifying a user that has interacted with a document of the set of first documents;

identifying a point of view associated with the user, based on a profile associated with the user; and associating the point of view with at least one document of the set of second documents.

14. The system of claim 11, wherein calculating the point of view comprises:

analyzing content of a document of the second set of documents; and based on keywords identified from the analyzing, identifying at least one point of view to associated with the document.

15. The system of claim 9, the operations further comprising:

identifying an entry point in the timeline document;

selecting a second entry point in a target timeline document;

calculating a similarity score based on metadata associated with the entry point and metadata associated with the second entry point; and adding a link between the entry point and the second entry point when the similarity score exceeds a threshold.

16. The system of claim 9, wherein extracting a contextual vector comprises:

clustering the set of first documents according to at least one subject matter;

identifying those clusters that have a number of documents over a threshold and, for each cluster so identified:

extracting an n-gram for the cluster and storing the n-gram as part of the contextual vector;
selecting a set of individuals, the set of individuals comprising both experts and non-experts;
identifying a set of documents in the identified cluster based on the set of individuals;
clustering the set of documents to identify sub-topics within the set of documents, the clustering defining a set of sub-clusters;
identifying sub-clusters of the set of sub-clusters that have a second number of documents over a second threshold and extracting a sub-cluster n-gram for each identified sub-cluster; and
storing each sub-cluster n-gram as part of the contextual vector.

17. A machine-readable medium having executable instructions encoded thereon, which, when executed by at least one processor of a machine, cause the machine to perform operations comprising:
accessing a set of first documents collected over a period of time from at least one social media service;
extracting, from the set of first documents, a contextual vector comprising a set of representative n-grams, the set of representative n-grams describing aspects of the first set of documents;
identifying a set of second documents linked to by the set of first documents;
ranking the set of second documents according to selected criteria;
selecting a first subset of the set of second documents based upon the ranking;
for each document of the first subset of the set of second documents, calculating a selection score based on similarity to at least a portion of the contextual vector;
select selecting a second subset of the set of second documents from the first subset; and
creating an entry into a timeline document, the entry comprising one or more of:
at least a portion of the second subset of the set of second documents;
a point of view associated with at least a portion of the second subset of the set of second documents;
a title from at least one document in the second subset of the set of second documents;
a description from at least one document in the second subset of the second set of documents; and
at least one document of the original documents from the first set of documents; and
storing the entry into the timeline document.

18. The machine-readable medium of claim 17, wherein the selected criteria comprises at least one of: number of likes; number of retweets; number of clicks; number of views; and combinations thereof.

19. The machine-readable medium of claim 17, the operations further comprising:
identifying an entry point in the timeline document;
selecting a second entry point in a target timeline document;
calculating a similarity score based on metadata associated with the entry point and metadata associated with the second entry point; and
adding a link between the entry point and the second entry point when the similarity score exceeds a threshold.

20. The machine-readable medium of claim 17, wherein extracting a contextual vector comprises:
clustering the set of first documents according to at least one subject matter;
identifying those clusters that have a number of documents over a threshold and, for each cluster so identified:
extracting an n-gram for the cluster and storing the n-gram as part of the contextual vector;
identifying a set of documents in the identified cluster from a cluster of individuals, the cluster of individuals comprising experts and non-experts;
clustering the set of documents to identify sub-topics within the set of documents, the clustering defining a set of sub-clusters;
identifying sub-clusters of the set of sub-clusters that have a second number of documents over a second threshold and extracting a sub-cluster n-gram for each identified sub-cluster; and
storing each sub-cluster n-gram as part of the contextual vector.

* * * * *